United States Patent [19]

Seijo

[11] Patent Number: 4,609,585
[45] Date of Patent: Sep. 2, 1986

[54] CORRECTION TAPE FOR COPIES

[76] Inventor: Takeyosi Seijo, 33-12, Daita 1 Chome, Setagaya-ku, Tokyo, Japan

[21] Appl. No.: 747,131

[22] Filed: Jun. 20, 1985

[30] Foreign Application Priority Data

Jan. 31, 1985 [JP] Japan .................................. 60-15472

[51] Int. Cl.$^4$ ............................................. B32B 23/02
[52] U.S. Cl. ................... 428/194; 400/240.1;
428/203; 428/204; 428/207; 428/354; 428/913
[58] Field of Search ...................... 400/240.1; 427/141;
428/913, 914, 194, 203, 204, 207, 201, 354

[56] References Cited

U.S. PATENT DOCUMENTS

| 3,141,539 | 7/1964 | Wolowitz | 400/240.1 |
| 3,752,291 | 8/1973 | Barouh et al. | 400/240.1 |
| 4,482,262 | 11/1984 | DiLuco | 400/240.1 |

FOREIGN PATENT DOCUMENTS 2304997  8/1973  Fed. Rep. of Germany ... 400/240.1

Primary Examiner—George F. Lesmes
Assistant Examiner—P. R. Schwartz
Attorney, Agent, or Firm—Flynn, Thiel, Boutell & Tanis

[57] ABSTRACT

A correction tape comprising a transparent or semi-transparent base tape; an opaque layer coated on at least one face of the base tape, leaving at least one side part of the coated face, and having the same color as the color of an original or master; a transparent or semi-transparent layer formed on one coated face of said base tape and allowing writing thereon; and an adhesive layer on another face of the base tape. The correction tape eliminates the problems of shadows or unwanted dark lines encountered in making copies from originals corrected by covering the portion to be corrected with paper, using a duplicating machine, and thereby provides shadowless clean copies. Further, corrections can be made directly on the correction tape adhered to an original sheet. In this case, the corrected portion can be completely covered up and correction tape or corrected portion can not be detected in the copy.

8 Claims, 6 Drawing Figures

CORRECTION TAPE FOR COPIES

BACKGROUND OF THE INVENTION

The present invention relates to a correction tape useful for making shadowless clean copies from original documents or drawings corrected by covering an area to be corrected or modified with a piece of paper, for example, a thin paper such as a plain paper or a relatively thick paper with a thickness of 1 mm to 2 mm, or other duplicating masters corrected in the same manner, and, more particularly, to a correction tape used for covering the periphery of of the paper put onto the area to be corrected in the originals or duplicating masters, thereby providing clean copies free of shadows would otherwise appear along the periphery of the patched paper when copying.

Further, this invention relates to a shadowless tape useful for correction or modification of letters or drawings in which the correction tape is put onto the portions to be corrected or modified in original documents or drawings and correction or modification is made on the tape. In making copies of originals or duplicating masters thus corrected, since the shadow of the correction tape does not appear in the copies, the corrected portions can no longer be detected in the copies and thereby clear copies can be obtained. Heretofore, when correction or modification is required in original documents or drawings, a different paper having an appropriate size is patched onto the portions to be corrected or modified and correction or modification is made on the paper. However, in making copies from the originals corrected in such a manner, using a copying machine, unfavorable shadows or dark lines are unavoidably formed in the resulting copies due to the difference in thickness between the patched portion and the other portion.

In order to eliminate such problems, for example, a correction tape, as shown in FIG. 4, has been proposed by the inventor of the present invention, the correction tape comprising a transparent base tape 1, a white opaque layer 4 coated on the central part of the base tape 1 and an adhesive layer 2 on the opaque layer 4. Although this correction tape can eliminate the shadow or dark line appearing in a copy due to the difference in thickness, it is particularly very difficult to form the opaque layer 4 with a sufficient thickness to completely cover up corrected or modified portions of the originals or masters, because the opaque layer 4 becomes more susceptible to cracking and delamination due to bending or the like with increase in the thickness thereof. Therefore, it is highly desirable to develop correction tape which can make correction or modification of the original indistinguishable in making copies and provide copies free of the shadow or dark lines.

SUMMARY OF THE INVENTION

It is therefore a primary object of the invention to provide a correction tape which can meet to above-mentioned demand while overcoming the disadvantages experienced in the correction tape currently available and particularly to provide an improved shadowless correction tape which has an opaque layer with a thickness enough to cover the portions to be corrected in originals or masters, thereby providing clean copies in which the corrected portions can not be detected.

Another object of the present invention is to provide a correction tape effacing the shadows of paper put onto the correction area of an original document or drawing from the copy in which the correction tape is stuck onto the periphery of the bonded paper.

According to the present invention, there is provided a correction tape in order to overcome the above-mentioned disadvantages heretofore experienced, the correction tape comprising a transparent or semi-transparent base tape; an opaque layer coated onto one or both faces of the base tape, leaving at least one side part of the coated face, and having the same color as that of an original or master sheet to be corrected; a transparent or semi-transparent layer formed on one coated face of the base tape and allowing correction to be written thereon; and an adhesive layer on another face of the base tape.

In the present invention, since the opaque layer is covered or protected with the overlying transparent or semi-transparent layer, the opaque layer is no longer subject to cracking or delamination due to bending, folding or the like, even if it is a thick film. Thus, it is possible to form the opaque layer having a thickness sufficient to mask correction portions of the original and thereby render the portions indistinguishable in the copy. Further, when correction is required in a relatively wide area, the correction area of the original or duplicating master can be made indistinguishable in its copy by covering the periphery of the paper patched on the area with the correction tape of the present invention prior to copying and a shadowless clean copy can be obtained.

DETAILED DESCRIPTION OF THE INVENTION

As set forth above, the present invention resides in a correction tape comprising a transparent or semi-transparent base tape; an opaque layer coated on one or both faces of the base tape, while leaving at least one side area of the coated face; a transparent or semi-transparent layer formed on one coated face of the base tape; and an adhesive layer on another face of the base tape.

In the correction tape set forth above, a polyester film may be used as a preferable base tape material, but any one of other transparent or semi-transparent synthetic resin films may be also employed.

Although an acetate resin film is employed as a preferred material of the transparent or semi-transparent layer formed on the opaque layer and allowing writing thereon, other transparent or semi-transparent synthetic resin film can be also employed.

Now, the present invention will be described in detail with reference to accompanying drawings.

Figure 1:
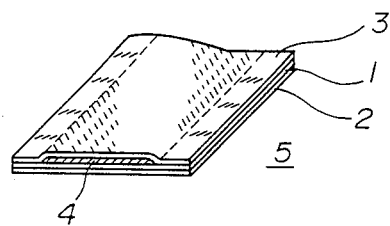
FIG. 1 is a perspective view showing a correction tape according to one embodiment of the present invention.

FIG. 1 is a perspective view illustrating a representative embodiment of the present invention. As illustrated in this figure, a white opaque layer 4 is longitudinally formed in the central area of the surface of a transparent or semi-transparent base tape 1, for example, a polyester film tape, while leaving both marginal portions of the surface uncoated. Further, the opaque layer 4 is covered with a transparent or semi-transparent layer 3, for example, acetate film, and an adhesive layer 2 is formed on the back of the base tape 1.

In the correction tape, the white opaque layer 4 is preferably formed after evaporating a metal layer as an underlayer onto the surface of the base tape 1, because the opaque layer 4 can be easily formed as a continuous, uniform opaque film even if it is a thin film.

The white opaque layer 4 is usually applied onto the polyester film as the base tape 1, but the opaque layer 4 may be firstly formed by applying it onto the surface of the transparent or semi-transparent layer 3 of the acetate film and then bonding the transparent or semi-transparent film 3 to the base tape 1 so as to sandwich the opaque layer 4 between them.

Figure 2:
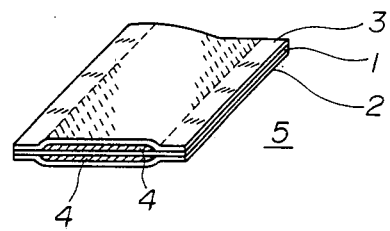
FIG. 2 is a perspective view of a correction tape according to an alternate embodiment of the present invention.
Figure 3:
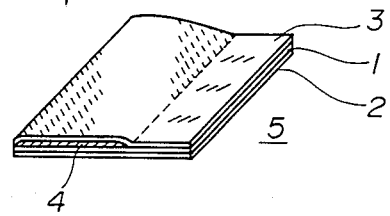
FIG. 3 is a perspective view of a correction tape according to a further embodiment of the present invention.
Figure 4:
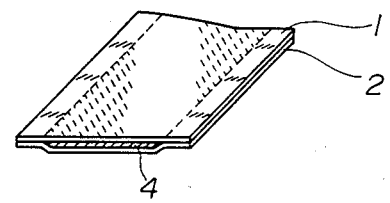
FIG. 4 is a perspective view of a conventional correction tape.

FIG. 2 is the illustration of another embodiment of the present invention wherein the white opaque layer 4 is formed on the both sides of the base tape 1. A further embodiment of the present invention is shown in FIG. 3, in which the white longitudinal opaque layer 4 covers the base tape 1, leaving only one marginal area of the face uncovered, and such an opaque layer 4 may be more conveniently employed depending the position of letters or the drawing to be corrected. In the above embodiments, only a white opaque layer is described as an example, but the color of the opaque should be the same as that of the original sheet.

Figure 5:
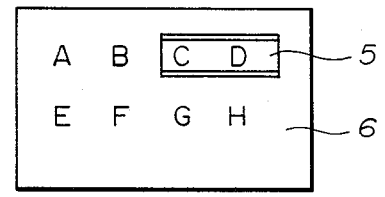
FIGS. 5 and 6 are plan views illustrating correction tapes according to the present invention in actual use.
Figure 6:
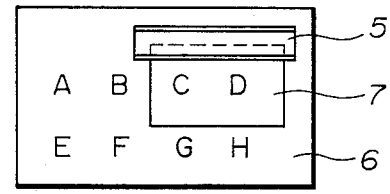

FIGS. 5 and 6 illustrates the manner of using the correction tape of the present invention. In FIG. 5, the correction tape 5 is bonded onto the portion to be corrected in an original paper 6 and then corrections C and D are written on the tape 5. FIG. 6 shows another case where a wider area is corrected. In this case, a piece of paper 7 is patched onto the area to be corrected and corrections, C and D, are written on the piece. Prior to copying, the correction tape 5 of the present invention is stuck along the periphery of the patched paper in order to efface the shadow due to the difference in thickness. By such correction, it is possible to make the corrected portions indistiguishable from other un-corrected portion and obtain clean copies free of shadow of the correction tape 5 shown in FIG. 5 or the periphery line of the patched paper 7 in FIG. 6. In both instances, the adhesive layer 2 of the correction tape 5 is stuck to the original paper 6 in order to bond the correction tape thereof.

As previously described, the correction tape according to the present invention can successfully cover up the difference in thickness in the periphery of a covered area. Further, since the opaque layer has a sufficient thickness, corrected portions can be completely covered with the correction tape and correction can be easily written on the correction tape. When making copies from the thus corrected originals or masters, any shadow or dark line due to the periphery of the patched paper or the correction tape is no longer detected.

What is claimed is:

1. A correction tape, comprising: a transparent or semi-transparent base tape; an opaque layer coated on at least one face of said base tape, leaving at least one side area of said face uncoated, and having the same color as the color of an original or a duplicating master; a transparent or semi-transparent layer formed on said one face of said base tape and allowing writing images thereon; and an adhesive layer on the opposite face of said base tape.

2. A correction tape as claimed in claim 1 in which said base tape is made of a polyester film.

3. A correction tape as claimed in claim 1 in which said transparent or semi-transparent layer is made of an acetate film.

4. A correction tape as claimed in claim 1 in which a metallic sublayer is formed on said one face of said base tape and under said opaque layer.

5. A laminated correction tape, comprising: a transparent or semi-transparent base tape; a first opaque layer coated on and covering a portion of one face of said base tape so that at least one marginal edge portion of said one face of said base tape is not coated by said first opaque layer, a transparent or semi-transparent top layer overlying said first opaque layer and the uncoated portion of said base tape, said top layer being made of a material capable of receiving written indicia thereon; and an adhesive layer on the opposite face of said base tape.

6. A laminated correction tape as claimed in claim 5 in which said first opaque layer is coated on the central portion of said one face of said base tape and two opposite marginal edge portions of said one face of said base tape are not coated by said first opaque layer, said top layer covering the entirety of said first opaque layer and said two marginal edge portions of said base tape.

7. A laminated correction tape as claimed in claim 5 in which a second opaque layer is coated on said opposite face of said base tape and said adhesive layer is coated on and covers said second opaque layer.

8. A laminated correction tape as claimed in claim 5 in which said first opaque layer is coated on the central portion of said one face of said base tape so that two opposite marginal edge portions of said one face of said base tape are left uncoated by said first opaque layer, said top layer covering the entirety of said first opaque layer and said two marginal edge portions of said base tape, and including a second opaque layer coated on said opposite face of said base tape, said adhesive layer being coated on and covering the entirety of said second opaque layer and said opposite face of said base tape.

* * * * *